United States Patent [19]

Pacht

[11] 4,349,154
[45] Sep. 14, 1982

[54] POWER ASSISTED DUMP VALVE

[75] Inventor: Amos Pacht, Houston, Tex.

[73] Assignee: Butterworth, Inc., Houston, Tex.

[21] Appl. No.: 90,401

[22] Filed: Nov. 1, 1979

[51] Int. Cl.$^3$ .............................................. B05B 9/00
[52] U.S. Cl. .................................. 239/124; 239/569; 137/625.6
[58] Field of Search .............. 239/124, 126, 570, 569; 251/30, 41, 44, 28; 137/625.6

[56] References Cited

U.S. PATENT DOCUMENTS

| | | | |
|---|---|---|---|
| 2,913,005 | 11/1959 | Grant et al. | 137/625.6 |
| 3,140,049 | 7/1964 | Norstrud et al. | 239/126 |
| 3,454,030 | 7/1969 | Nelson | 239/126 X |
| 3,604,459 | 9/1971 | Rosaen | 137/625.6 |
| 3,628,727 | 12/1971 | Gjerde | 239/124 |
| 3,765,607 | 10/1973 | Pacht | 239/124 |
| 3,856,047 | 12/1974 | Takayama | 137/625.6 |
| 3,885,739 | 5/1975 | Tottle | 239/124 |

Primary Examiner—Robert B. Reeves
Assistant Examiner—Gene A. Church
Attorney, Agent, or Firm—Hubbard, Thurman, Turner, Tucker & Glaser

[57] ABSTRACT

In a high pressure fluid system for providing fluid to a hand held nozzle, an improved power assisted dump valve which may be remotely located and controlled. The dump valve includes a stepped piston positioned in a stepped bore with one end of the piston adapted for sealing off a pressure relief outlet. A fluid conduit, preferably a passageway through the piston, conducts high pressure fluid to the valve chamber at the large diameter end of the piston. A control valve either seals off the large diameter end of the chamber or vents it to ambient pressure so that differential pressure supplied by the working fluid itself drives the valve piston to its open or closed positions. An electrical, hydraulic, or mechanical actuator operates the control valve, remotely if desired, to control the flow of high pressure fluid to the nozzle.

19 Claims, 7 Drawing Figures

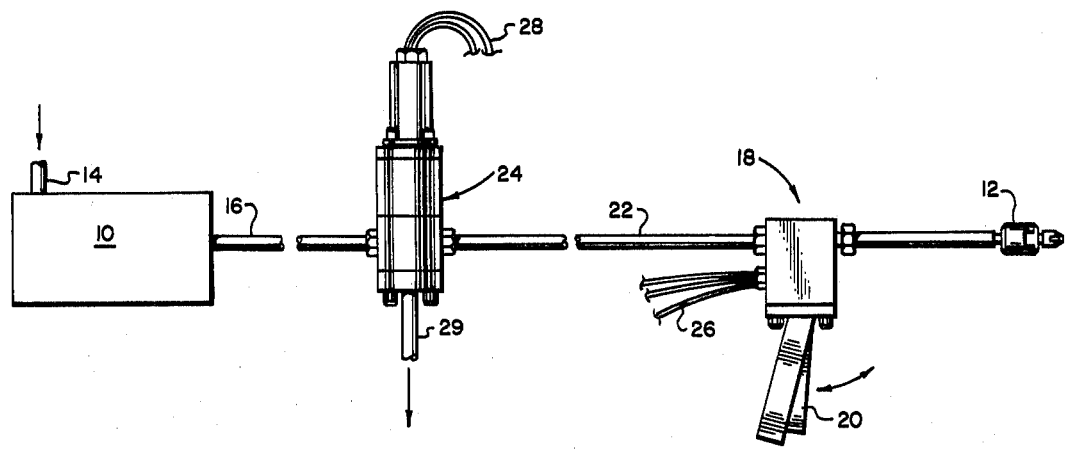
FIG. 1
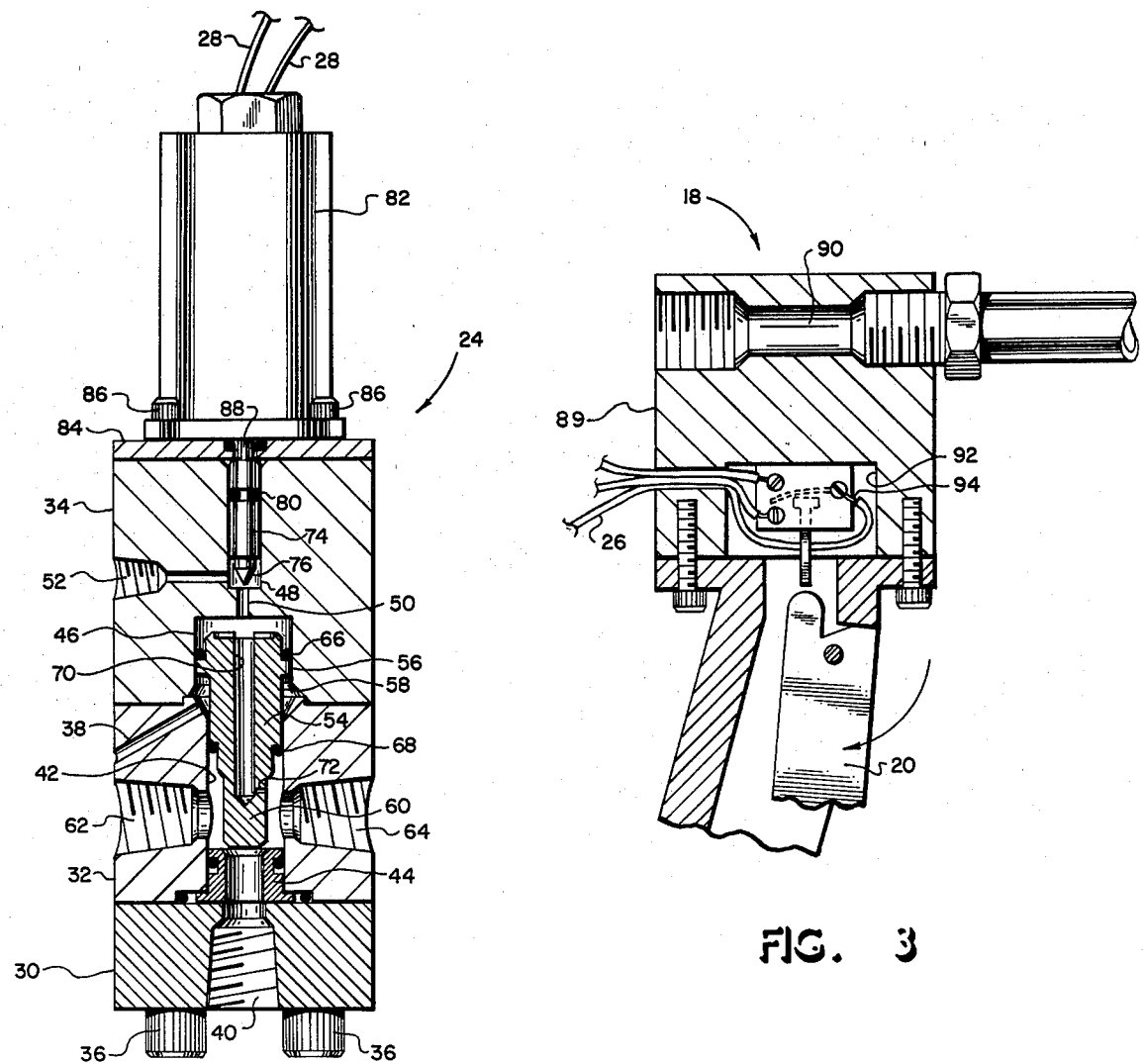
FIG. 2
FIG. 3

POWER ASSISTED DUMP VALVE

BACKGROUND OF THE INVENTION

This invention relates to a high pressure fluid delivery system and in particular to a power assisted dump valve for use in controlling the flow of fluid through a nozzle.

High pressure fluid delivery systems have been used for many cleaning applications. Many details of such systems are illustrated by U.S. Pat. No. 3,765,607 issued to Pacht on Oct. 16, 1973 and assigned to the assignee of the present invention. Such systems typically use water for cleaning fluid and include a high pressure pump and a hand held nozzle for directing a stream of water at an object to be cleaned. Most such systems also include a valve arrangement, usually in the hand held nozzle assembly, by which the operator can stop and start the flow of high pressure fluid through the nozzle. Due to the fact that the pressures used in such systems often exceed ten thousand pounds per square inch, the construction of valves which will operate safely is much more difficult than it would at first seem. The valves often require considerable force to operate and result in operator fatigue. A power assisted dump valve would therefore be desireable.

The high pressure flow from the nozzle assembly is usually stopped by simply switching the flow to a large opening to ambient pressure. It is sometimes desireable for the dump outlet to be located remotely from the nozzle while the valve is controlled from the nozzle location. It would therefore be desireable for a dump valve to be adapted for remote actuation.

SUMMARY OF THE INVENTION

Accordingly, an object of the present invention is to provide an improved dump valve which requires a relatively short stroke and minimum force to operate.

Another object of the present invention is to provide a dump valve which may be remotely actuated to control the flow of fluid to a hand held nozzle.

These and other objects are achieved by providing a power assisted dump valve and means for controlling the operation of the dump valve. The dump valve comprises a piston carried within a housing having a fluid inlet and a dump outlet. The piston is driven by working fluid pressure on opposite ends to selectively close or open the dump outlet. A control valve selectively controls the relationship between forces applied to opposite sides of the piston to control piston position. In a preferred form the dump valve includes a body having a three step bore carrying a three step piston. A large end and intermediate size portion of the piston each fit the stepped bore in fluid tight arrangement. A small end of the piston forms a valve for sealing off or opening a dump outlet. A fluid inlet is in communication with the intermediate sized section of the valve chamber. The large diameter end of the valve chamber is selectively sealed by a control valve. A conduit, preferably formed through the valve piston, supples high pressure fluid to the large diameter end of the valve chamber so that differential forces acting on the valve piston force it to either open or close the dump outlet. Means are provided at the nozzle assembly for switching the control valve from open to closed positions.

BRIEF DESCRIPTION OF DRAWINGS

The present invention may be better understood by reading the following detailed description of the preferred embodiments with reference to the accompanying drawings wherein:

FIG. 1 is a partially schematic illustration of an overall high pressure fluid delivery system utilizing a power assisted dump valve of the present invention in a remotely controlled arrangement;

FIG. 2 is a partially cross-sectional illustration of the dump valve of FIG. 1;

FIG. 3 is a cross-sectional illustration of a portion of the hand held nozzle assembly of FIG. 1;

DESCRIPTION OF THE PREFERRED EMBODIMENTS

Figure 4:
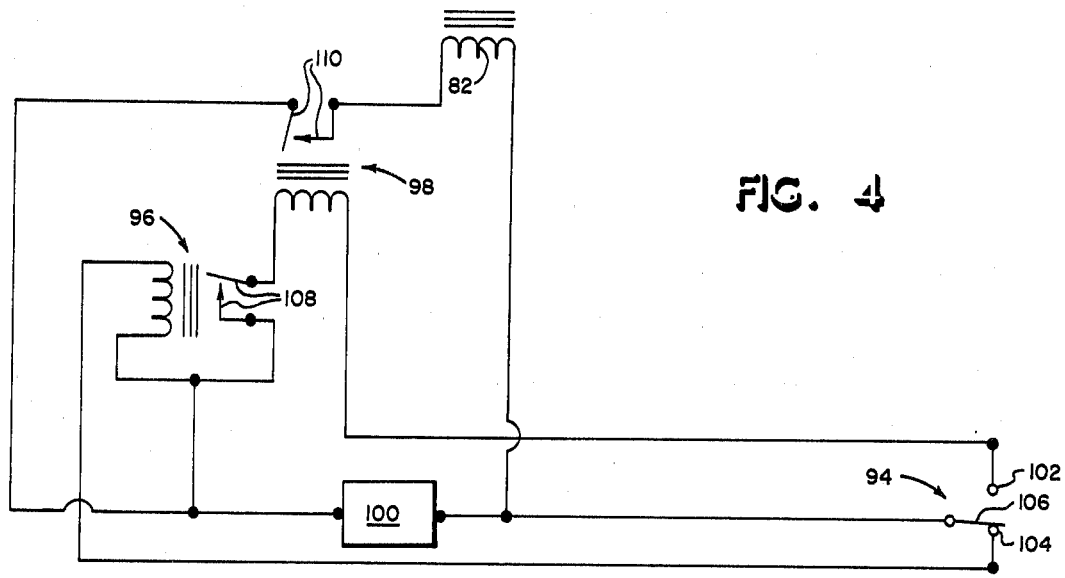
FIG. 4 is a schematic diagram of a circuit useful with the apparatus of FIGS. 4 and 5.

With reference now to FIG. 1, there is illustrated a typical high pressure fluid system using a power assisted dump valve according to the present invention. As stated above, such fluid cleaning systems comprise primarily a high pressure pump 10 and some form of nozzle 12 for directing pressurized fluid at a surface to be cleaned. The pump 10 receives low pressure fluid at an inlet 14 and supplies high pressure fluid at an outlet 16. The nozzle 12 is typically attached to a hand held nozzle assembly 18 including some type of trigger 20 for controlling the flow of fluid from nozzle 12. The assembly 18 is typically connected to the pump by means of a flexible hose 22. In the present invention, a remotely actuated dump valve 24 is connected to the outlet 16 of pump 10 to control the flow of high pressure fluid entering the line 22. Valve 24 may conveniently be mounted directly to outlet 16 of pump 10 or at some convenient position intermediate pump 10 and nozzle 18, for example near a drain. In any case, valve 24 is, in this embodiment, remote from nozzle assembly 18. In this embodiment, the valve 24 is electrically controlled by means of a switch in nozzle assembly 18, shown in more detail in FIG. 3. Circuitry, such as that shown in FIG. 4, interconnects the switch in nozzle assembly 18 to the valve 24, which is solenoid actuated. Electrical wires 26 and 28, which for convenience may be embedded into or wrapped around flexible hose 22, connect the nozzle assembly 18 to the valve 24. The operator of the system of FIG. 1 uses this system in exactly the same manner as prior art systems but he must apply only a small amount of force to trigger 20 to actuate valve 24. In this embodiment the operator does not experience the same level of kick upon stopping the high pressure flow or the dumping of fluid at his feet. That is, when the operator releases trigger 20, the valve 24 dumps the fluids from pump 10 to ambient pressure through a dump outlet 29.

With reference now to FIG. 2 there is illustrated, partially in cross-section, a preferred form of a power assisted valve according to the present invention. This valve, designated generally 24, is formed within a housing formed from three basic portions 30, 32 and 34. These three housing sections are coupled together by four bolts 36 passing through sections 30 and 32 and threaded into section 34. As illustrated, an O-ring seal is used to seal section 30 to section 32. No seal is provided between sections 32 and 34 since the junction of these two portions is vented to ambient pressure by vent 38.

Section 30 includes an outlet 40 for coupling to the dump outlet line 29 illustrated in FIG. 1. In the preferred embodiment the entire housing 24 is of generally cylindrical shape and the outlet 40 lies along the axis of the cylinder and is aligned with other bores passing through the other portions of the housing. Section 32 has an essentially cylindrical bore 42 passing along its axis. A separate valve seat is provided at the bottom of bore 42 by means of a hardened steel insert 44, which is sealed to the bore 42 by an O-ring. A bore 46 having a diameter larger than bore 42 is provided in the lower portion of section 34 of the housing 24. Another bore 48 is provided in the upper portion of section 34 and is in communication with bore 46 through a small orifice 50 again preferably lying on the axis of the cylindrical body 24. A vent 52 is provided through the side of section 34 to vent the lower portion of bore 48 to ambient pressure.

The bores 42 and 46 in sections 32 and 34 of the housing 24, together form a chamber in which is carried a piston 54. Piston 54 comprises a large diameter upper section 56, an intermediate diameter section 58 and a small diameter lower portion 60. A pair of ports 62 and 64 are provided in section 32 adjacent the small end 60 of piston 54, for connection to lines 16 and 22 of FIG. 1. Peripheral seals 66 and 68, in the form of O-rings, are provided on portions 56 and 58 of piston 54. Seal 66 forms a closed chamber between large end 56 of piston 54 and the upper end of bore 46. Likewise seal 68 forms a closed chamber between the intermediate sized portion 58 of piston 54 and the lower end of bore 42. The vent 38 maintains the portions of bores 42 and 46 between seals 66 and 68 at ambient pressure. Communication between the chamber above seal 66 and the chamber below seal 68 is provided by an axial bore 70 and a radial orifice 72, both formed in piston 54.

A control valve 74 is carried within bore 48 in section 34 of the housing of the valve 24. Valve 74 has a tapered surface 76 on a lower end which mates with the upper end of orifice 50. Normal fluid pressures urge valve 74 away from the orifice 50 so that bores 46 and 48 normally remain in communication with each other. The control valve 74 is sealed to bore 48 by means of an O-ring seal 80.

As noted above, in this embodiment the dump valve 24 is operated by a solenoid 82. The solenoid 82 and a valve cover plate 84 are connected to the upper end of section 34 of valve 24 by means of bolts 86. Solenoid 82 includes an armature 88 which extends through the plate 84 into the bore 48 to contact an upper end of control valve 74. The electrical wires 28, which are also illustrated in FIG. 1, supply necessary electrical current to a coil within solenoid 82 in a conventional manner. When current is supplied to solenoid 82, the armature 88 forces valve 74 downward so that the tapered surface 76 seals the upper end of orifice 50.

With reference now to FIG. 3, there is provided a cross-sectional illustration of a portion of the nozzle assembly 18 of FIG. 1. The assembly 18 includes a rectangular block 89 having a conduit 90 passing through an upper end. Conduit 90 is simply a straight through passage adapted for receiving the supply line 22 at one end and the nozzle 12 at the other. A cavity 92 is provided in a lower end of the block 89 and carries an electrical switch 94. The electrical wires 26 shown in FIG. 1 extend from the switch 94 for coupling to the solenoid 82. As illustrated, the switch 94 is mechanically coupled to the trigger 20 for manual operation. It is apparent that switch 94 may simply be used to selectively connect or disconnect a source of electrical current to the solenoid 82, but in the preferred embodiment the circuitry of FIG. 4 is employed to drive solenoid 82 in response to operation of switch 94.

With reference now to FIG. 4, circuitry designed for fail-safe operation of the high pressure fluid delivery system of FIG. 1 is illustrated. The switch 94, also illustrated in FIG. 3, comprises a single pole double throw switch. A coil 82 represents the solenoid of FIG. 2. The circuitry also include relays 96 and 98 and a 12 volt power supply 100, such as a battery. Switch 94 has a normally open fixed contact 102, a normally closed fixed contact 104 and a wiper, or moving contact, 106. Relay 96 has a normally closed contact set 108 which is controlled by the position of wiper 106 and the fixed contact 104 of switch 94. Thus, when the trigger 20 is not depressed, switch 94 provides power from the power supply 100 to relay 96 which maintains contact pair 108 in an open condition as illustrated. The other relay 98 is controlled by the series connection of the contact pair 108 and the normally open contact 102 and wiper 106 of switch 94. Relay 98 has a contact pair 110 which is normally open, that is open when the relay 98 is not energized. Contact pair 110 in turn controls the flow of current through coil 82 to thereby control the actuation of dump valve 24. When trigger 20 is depressed and the wiper 106 moves away from the contact 104, relay 108 is deactivated so that contact pair 108 closes. Upon further motion of wiper 106 in response to movement of trigger 20 it makes contact with the fixed contact 102 to complete a circuit which activates relay 98. Activation of relay 98 closes the contact pair 110 which then supplies current to coil 82 to activate dump valve 24 and provide high pressure fluid to the nozzle 12. Upon release of trigger 20 the high pressure fluid flow should stop when wiper 106 moves away from contact 102 or, in any case, when contact 106 makes contact with the fixed contact 104. It is apparent that numerous other circuits would be suitable for controlling solenoid 82 in response to the activation of switch 94.

With reference now to FIGS. 1 through 4, the operation of the improved power assisted dump valve 24 in this embodiment will be described. The drawings of piston 54 and valve 74 in FIG. 2 illustrate the valve 24 in its start up condition when pump 10 is supplying fluid through inlet line 16, but the operator has not called for high pressure fluid by depressing trigger 20. In this condition, substantially all fluid entering port 62 is dumped through the dump port 40 and outlet 29 which does provide a low level of back pressure within the bore 42. This pressure is also applied through the orifice 72 and bore 70 to the orifice 50 and thereby to the upper bore 48. Since the operator has not activated the solenoid 82, valve 74 is free to float within bore 48 and is lifted away from orifice 50 by this pressure. As a result, the chamber above piston 54 is vented to atmospheric pressure through the port 52. In this preferred embodiment, orifice 50 has four times the cross sectional area of the orifice 72. For example, orifice 50 may have a diameter of 1/16th inch while orifice 72 has a diameter of 1/32nd inch. As a result, a majority of the pressure drop occurs at orifice 72 and piston 54 experiences a differential force lifting it to its upward position in which the dump outlet 40 is open so that essentially no high pressure fluid is supplied to port 64 which is coupled to the nozzle 12.

Figure 5:
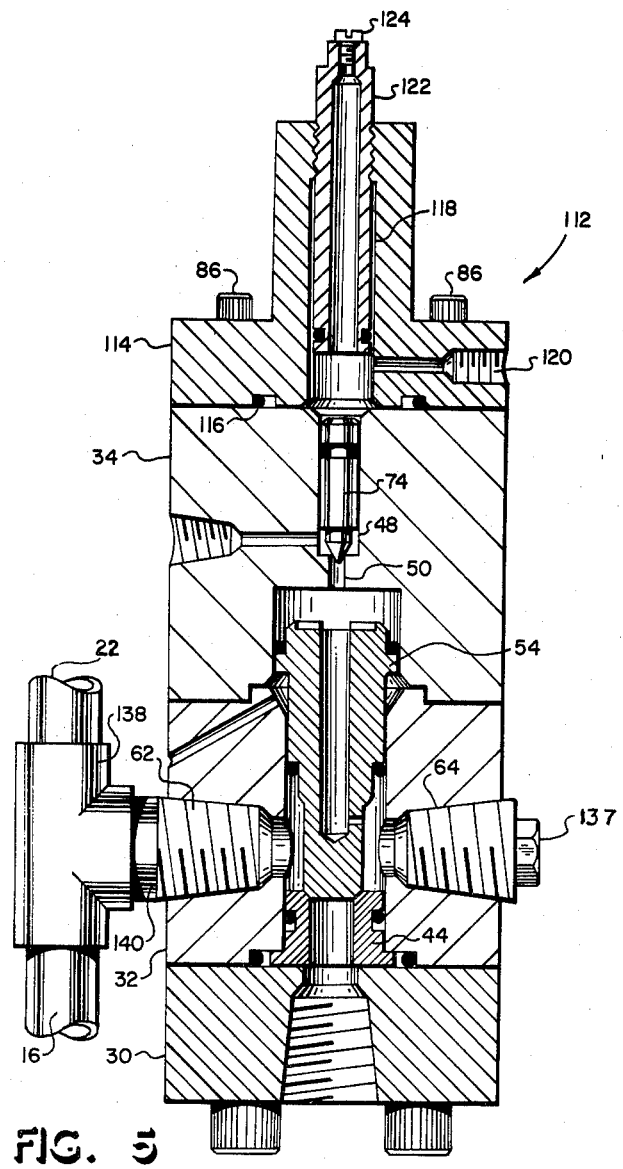
FIG. 5 is a cross-sectional illustration of a dump valve employing a hydraulic valve actuator.

When the operator calls for high pressure fluid at nozzle 12 by depressing trigger 20, current is applied to solenoid 82 which drives its armature 88 downward forcing valve 74 to seal off orifice 50. As a result, fluid flowing through the orifice 72 into the chamber above piston 54 is no longer vented to ambient pressure. Pressures below and above piston 54 are therefore equalized. However, since the upper end 56 of piston 54 has a larger diameter than the lower end 60, a differential force is applied to piston 54 driving it downwards to a position where it contacts seat 44. These positions of valve 74 and piston 54 are illustrated in FIG. 5. The rate of downward motion of piston 54 is related to the size of orifice 72. As the lower end 60 of piston 54 approaches seat 44 the dump outlet 40 is sealed off and fluid supplied to inlet 62 must flow out port 64 to the nozzle 12. As a result, the pressure within bore 42 rises to its operating level and drives the piston 54 with greater force towards the seat 44. When the piston 54 actually contacts seat 44, the area of piston 54 experiencing an upward force is decreased since the port 40 exposes the small diameter end 60 to ambient pressure. As a result, the differential pressure holding piston 54 against seat 44 is further increased. It can be seen that considerable force is applied to piston 54 holding it firmly against the dump outlet valve seat 44 under operating conditions.

During normal operating conditions, it can be seen that the maximum operating pressure is applied to the tapered surface 76 of valve 74. But since the orifice 50 is of very small diameter, the force required to hold valve 74 down is relatively small. In this electrically operated embodiment the solenoid 82 supplies the required force so that the operator need only depress trigger 20 with sufficient force to close the switch 94. When the operator no longer desires the flow of high pressure fluid to nozzle 12, he simply releases the trigger 20 and the above process is reversed. When current is no longer applied to solenoid 82 the armature 88 is withdrawn into the solenoid and the pressure in orifice 50 lifts valve 74 away from its seated position. The chamber above piston 54 is thereby vented to ambient pressure and the high level of operating pressure below piston 54 quickly lifts the piston away from seat 44 so that fluid entering port 62 is vented through the dump outlet 40.

With reference now to FIG. 5 a hydraulically actuated dump valve according to the present invention is generally designated 112. The lower portions of this valve comprising sections 30, 32 and 34, the valve 74, the piston 54 and the dump outlet seat 44 are all identical in construction to the FIG. 2 embodiment and need be described no further. In this FIG. 5 illustration, the piston 54 and valve 74 are illustrated in their closed, that is, operating positions. In this embodiment, a hydraulic actuator section 114 is substituted for the solenoid 82 of FIG. 2. Section 114 may be bolted to the top of valve section 34 by bolts 86 in the same manner as solenoid 82 and plate 84 were bolted in FIG. 2. In addition, an O-ring seal 116 is provided between the section 114 and section 34. A central bore 118 is provided in section 114 directly above and coaxial with bore 48 in section 34.

An inlet 120 is provided for supplying hydraulic or pnuematic fluid to the bore 118 to drive valve 74 downward against orifice 50 when an operator calls for high pressure fluid to a nozzle. An adjusting stem 122 is threaded into an upper end of section 114 and extends into bore 118 for allowing adjustment of a normal fluid pressure within bore 118. A vent 124 is also provided for bleeding air from the bore 118 when hydraulic fluid is employed.

Figure 6:
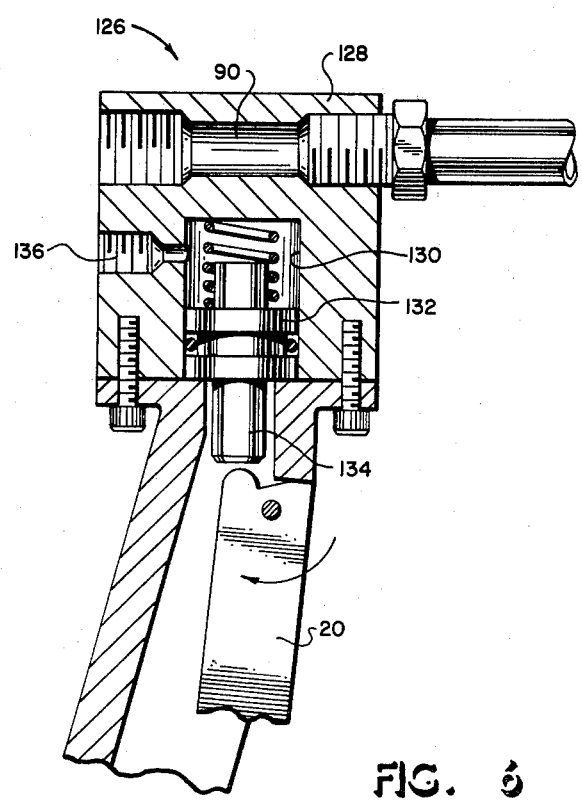
FIG. 6 is a cross-sectional illustration of a nozzle assembly including a hydraulic pump for use with the FIG. 5 valve.

With reference to FIG. 6, a cross-sectional illustration of a nozzle assembly 126 useful with the dump valve of FIG. 5 is provided. The assembly 126 comprises a block 128 having the chamber 90 identical with that provided in the FIG. 3 embodiment. A bore 130 is provided in a lower end of block 128 and carries a piston 132. A portion 134 of piston 132 extends from the lower end of block 128 for engaging the trigger 20. A port 136 provides communication with the portion of bore 130 above piston 132. In normal operation a conduit, preferably a flexible hose, connects the port 136 with port 120 of FIG. 5. As a result, it can be seen that when bore 130 of FIG. 6, bore 118 of FIG. 5 and an interconnecting conduit are all filled with hydraulic fluid, the depression of trigger 20 hydraulically drives valve 74 downward to seal off orifice 50 and actuate dump valve 24 as described above.

Additional features of this second embodiment of the present invention are illustrated in FIG. 5. While in the embodiment illustrated in FIGS. 1 thru 3, the high pressure fluid passes into port 62, through bore 42, and out of port 64 in normal operation, it is not essential that both ports 62 and 64 be provided. Thus, in the FIG. 5 embodiment a sealing plug 137 is installed in the outlet port 64 or alternatively the port 64 could be entirely omitted. A pipe "T" fitting 138 has one of its three ports connected to the other port 62 of dump valve 112. The conduits 16 and 22 of FIG. 1 are connected to the remaining two ports of the "T" fitting 138. It can be seen that with this connection of the dump valve 112, it may be positioned remotely from both the nozzle 12 and the pump 10 and only a single conduit 140 need be run from the "T" fitting 138 to the dump valve 112 itself.

The operation of the embodiment illustrated in FIGS. 5 and 6 is externally identical to that of the first embodiment. The operator calls for high pressure fluid to nozzle 12 by depressing trigger 20. Trigger 20 drives piston 132 into bore 130 which in turn drives hydraulic fluid into bore 118 in the dump valve 112 and forces the valve 74 downward into sealing engagement with orifice 50 as illustrated in FIG. 5. As described above, when orifice 50 is sealed by valve 74, differential forces acting on piston 54 force it downward into sealing engagement with the seat 44 to thereby seal off the dump outlet and force the fluids from pump 10 to be conducted to nozzle 12. Upon release of trigger 20 by the operator, hydraulic pressure within dump valve 112 lifts the valve 74 and forces the hydraulic fluid back into bore 130 in the nozzle assembly 126. If desired, the piston 132 in the nozzle assembly 126 may be assisted by a coil spring as illustrated.

Figure 7:
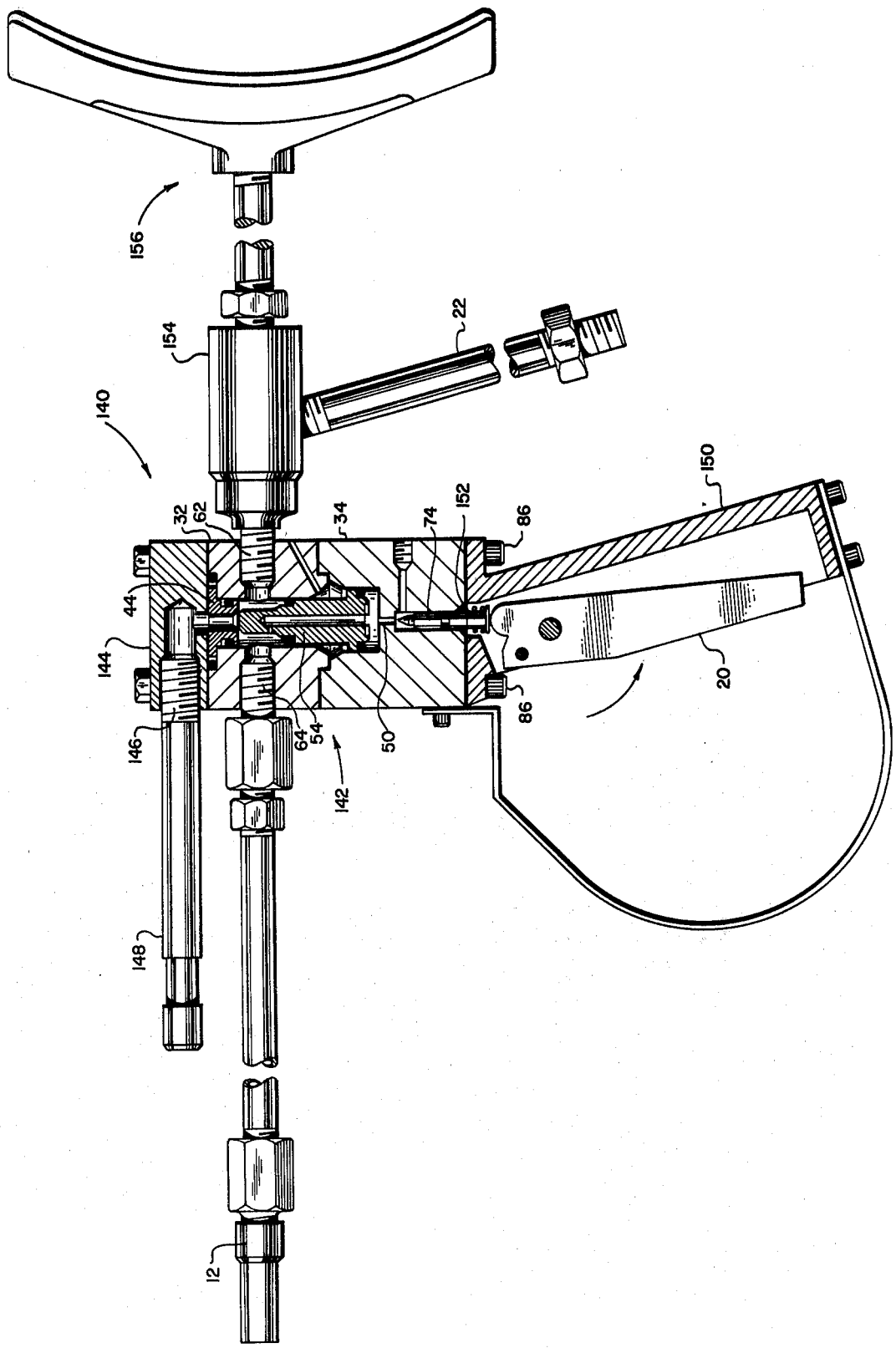
FIG. 7 is a partially cross sectional illustration of a nozzle assembly having a mechanically actuated dump valve according to the present invention.

With reference now to FIG. 7, a mechanically operated but power assisted dump valve according to the present invention is illustrated incorporated into a nozzle assembly generally designated 140. This embodiment again uses a dump valve 142 which include sections 32, and 34, valve 74, piston 54 and dump valve seat 44 which are identical to these portions of the dump valves illustrated in both FIGS. 2 and 5. In this embodiment these portions of the dump valve are installed in an inverted position so that valve 74 may be manually actuated by the trigger 20. The nozzle 12 is connected directly into port 64 and the inlet line 22 is coupled to the inlet port 62 in section 32 of the dump valve. The section 30 illustrated in FIGS. 2 and 5 is replaced by slightly modified section 144 which provides a side dump outlet port 146 into which a typical dump nozzle 148 is threaded. A handle assembly 150 carrying the trigger 20 replaces the solenoid 82 of FIG. 2 and the hydraulic actuator section 114 of FIG. 5 This section 150 may again be bolted on by the same bolts 86 used in the other embodiments. Handle 150 carries a sliding piston 152 which transmits force from trigger 20 to the valve 74. Additional elements illustrated in FIG. 7 include a connecting block 154 and a shoulder stock arrangement 156 which allows an operator to more easily manipulate the high pressure nozzle assembly.

The operation of the this FIG. 7 embodiment is again basically conventional in so far as the operator is concerned. Upon depressing the trigger 20, valve 74 is mechanically driven into engagement with the orifice 50 to in turn cause piston 54 to move into sealing engagement with the valve seat 44 and thereby cause the high pressure fluid to be conducted to nozzle 12. The internal functioning of the valve 74 is the same as described above with the other embodiments. The primary difference in this embodiment is that the dump outlet 148 is actually located at the high pressure nozzle which is a conventional arangement. In this FIG. 7 embodiment however, the operator need apply very little force to the trigger 20 since it takes very little force and a very short stroke to move valve 74 into sealing engagement with orifice 50 and to thereby actuate the piston 54. In previously known apparatus, a valve similiar to piston 54 was manually acutated by trigger 20, requiring a much longer stroke and greater force with a result that the operator became fatigued much more quickly.

As illustrated by these various embodiments, the dump valve according to the present invention may be actuated electrically, hydraulically, or mechanically. The hydraulic embodiment of FIG. 5 would operate from a pressurized air source with a supply of air controlled from a valve in the nozzle assembly. Likewise the air source could be switched by a solenoid operated valve located remote from the nozzle assembly and controlled by an electrical switch in the nozzle assembly such as that illustrated in FIG. 3.

While the present invention has been illustrated and described in terms of specific apparatus and methods of use, it is apparent that various other modifications may be made within the scope of the present invention as defined by the appended claims.

What is claimed is:

1. In a fluid system for supplying a high pressure stream of fluid, including a pump having a low pressure fluid inlet and a high pressure outlet, a valve coupled to said high pressure fluid outlet to control fluid flow, and a nozzle assembly coupled to said valve, an improved dump valve comprising:

a housing having a stepped cylindrical valve chamber having first, second, and third sections, said second section positioned between said first and third sections and having a diameter smaller than said first section and larger than said third section, a piston slideably carried within said chamber having first and second portions having diameters corresponding to and carried within said first and second chamber sections respectively, and a third portion, opposite said first portion, having a diameter smaller than said second portion for sealingly engaging said chamber third section, at least one high pressure fluid port in communication with said chamber second section, and a pressure relief port in communication with said chamber third section, first and second peripheral seals carried on said piston first and second portions respectively, said second seal positioned above said at least one high pressure fluid port, control valve means for selectively closing and venting to ambient pressure said chamber first section above said piston first peripheral seal, and conduit means for conducting fluid from said valve chamber second section below said piston second seal to said valve chamber first section above said piston first seal.

2. The apparatus of claim 1 further including means for venting said chamber first and second sections between said piston first and second seals to ambient pressure.

3. The apparatus of claim 1 wherein said conduit means comprises a passageway formed in said piston.

4. The apparatus of claim 3 wherein said conduit means includes a small diameter orifice for providing a pressure drop across said piston when said control valve means vents said chamber first section above said peripheral seal to ambient pressure.

5. Apparatus according to claim 1 wherein said chamber third section comprises an insert carried within an extension of said chamber second section.

6. The apparatus of claim 1 wherein said control valve means includes a control valve bore, a passageway extending from said valve chamber first section to a first end of said control valve bore and terminating in a control valve seat at said bore, a vent to ambient pressure coupled to said bore first end, a control valve slideably carried within said bore having a tapered surface on a first end for sealingly engaging said control valve seat, and actuator means for forcing said control valve to said bore first end and into engagement with said control valve seat.

7. Apparatus according to claim 6 wherein said actuator means comprises a manually operable fluid pump attached to said nozzle assembly having an outlet coupled to a second end of said control valve bore, whereby upon manual operation of said pump fluid pressure drives said control valve to said bore first end.

8. Apparatus according to claim 6 wherein said actuator means comprises a solenoid adjacent said control valve bore first end, said solenoid having an armature positioned to force said control valve to said bore first end in response to application of electrical current to said solenoid, a source of electrical current, and switch means at least partly carried within said nozzle assembly and coupled to said source of electrical current and said solenoid for selectively applying electrical current to said solenoid.

9. Apparatus according to claim 8 wherein said switch means includes an electrical switch carried within said nozzle assembly and relay means connected to said switch, to said solenoid, and to said source of electrical power for selectively applying electrical current to said solenoid in response to operation of said switch.

10. Apparatus according to claim 6 wherein at least a portion of said conduit means is of substantially smaller diameter than said passageway whereby a pressure drop is provided across said piston when said control valve vents said chamber first section to ambient pressure.

11. Apparatus according to claim 6 wherein said dump valve is formed integrally with said nozzle assembly, said nozzle assembly includes a trigger for controlling fluid flow to a nozzle and the control valve is mechanically coupled to said trigger.

12. Apparatus for controlling the flow of fluid from a high pressure pump to a nozzle comprising:
- a housing having a stepped bore, said bore having large and small diameter portions;
- a stepped piston having corresponding large and small diameter ends carried in said stepped bore;
- said housing having a fluid inlet and a dump outlet in said small diameter portion, said dump outlet positioned to be selectively closed by a surface of said piston small end;
- conduit means for conducting fluid from said bore small end to said bore large end;
- control valve means for selectively venting said bore large end to ambient pressure; and
- actuation means comprising a solenoid having an armature coupled to said control valve means, a source of electrical current, a manually operable switch carried by a nozzle, and means for supplying electrical current to said solenoid in response to operation of said switch.

13. Apparatus for controlling the flow of fluid from a high pressure pump to a nozzle comprising:
- a housing having a stepped bore, said bore having large and small diameter portions;
- a stepped piston having corresponding large and small diameter ends carried in said stepped bore;
- said housing having a fluid inlet and a dump outlet in said small diameter portion, said dump outlet positioned to be selectively closed by a surface of said piston small end;
- conduit means for conducting fluid from said bore small end to said bore large end;
- control valve means including a vent providing communication between said bore large end and ambient pressure and a control valve slideably carried in a bore having a first end for closing said vent and a second end defining a wall of a fluid tight chamber; and
- actuation means comprising a manually operable hydraulic fluid pump carried by a nozzle, said pump having an outlet coupled to said fluid tight chamber, whereby upon manual operation of said pump said control valve is driven into engagement with said vent.

14. Apparatus for controlling the flow of fluid from a high pressure pump to a nozzle comprising:
- a housing having a stepped bore, said bore having large and small diameter portions;
- a stepped piston having corresponding large and small diameter ends carried in said stepped bore;
- said housing having a fluid inlet and a dump outlet in said small diameter portion, said dump outlet positioned to be selectively closed by a surface of said piston small end;
- conduit means for conducting fluid from said bore small end to said bore large end;
- control valve means for selectively venting said bore large end to ambient pressure; and
- actuation means comprising a manually operable trigger carried by a nozzle and mechanically coupled to said control valve means.

15. In a fluid system for supplying a high pressure stream of fluid, including a pump having a low pressure fluid inlet and a high pressure outlet, a valve coupled to said high pressure fluid outlet to control fluid flow, and a nozzle assembly coupled to said valve, said valve comprising:
- a housing having a cylindrical bore;
- a piston slidably carried within said bore and dividing said bore into first and second chamber sections, respectively;
- at least one high pressure fluid port in communication with said chamber second section, and a pressure relief port in communication with said chamber second section;
- first and second peripheral seals carried spaced apart on said piston, said second peripheral seal positioned above said at least one high pressure fluid port;
- control valve means for selectively closing and venting to ambient pressure said chamber first section above said first peripheral seal;
- means for venting said bore between said first and second peripheral seals to ambient pressure; and
- conduit means for conducting fluid from said chamber second section below said second peripheral seal to said chamber first section above said first peripheral seal.

16. A valve for controlling the flow of fluid from a high pressure pump to a nozzle comprising:
- a housing having a cylindrical bore and a valve seat formed at one end of said bore; a piston disposed in said bore and having first and second pressure faces and adapted to divide said bore into first and second chambers respectively, said piston including a reduced diameter portion comprising a closure member engageable with said seat;
- an inlet port opening into said second chamber;
- a fluid dump port opening into said second chamber through said valve seat;
- said reduced diameter portion forms a third pressure face which is exposed to the fluid pressure in said second chamber when said closure member is moved away from said seat to urge said closure member away from said seat, and said third pressure face is exposed to the fluid pressure in said dump port when said closure member is engaged with said seat whereby a resultant increased pressure force due to fluid pressure acting on said first pressure face urges said piston in the valve closed position;
- restricted conduit means disposed in said piston and in communication with said first and second chambers;
- a vent passage in communication with said first chamber having a larger effective flow area than said conduit means;
- and a control valve for selectively opening and closing said vent passage to respectively vent and pressurize said first chamber to cause said piston to respectively move to open and close said dump port due to the resultant pressure forces acting on said pressure faces.

17. A valve according to claim 16 wherein said fluid inlet is connected to a conduit conducting fluid from said high pressure pump to said nozzle and said means for actuating is at least partially located with and physically attached to said nozzle;

said means for actuating comprising a solenoid having an armature coupled to said control valve means, a source of electrical current, a manually operable switch, and means for supplying electrical current to said solenoid in response to operation of said switch.

18. A valve according to claim 16 wherein said fluid inlet is connected to a conduit conducting fluid from said high pressure pump to said nozzle and said means for actuating is at least partially located with and physically attached to said nozzle;

said means for actuating comprising hydraulic cylinder means coupled to said control valve means, and a manually operable hydraulic pump coupled to said hydraulic cylinder means.

19. A valve according to claim 16 wherein said fluid inlet is connected to a conduit conducting fluid from said high pressure pump to said nozzle and said means for actuating is at least partially located with and physically attached to said nozzle;

said means for actuating comprising a manually operable trigger, said trigger mechanically coupled to said control valve means.

* * * * *